US012092981B2

(12) United States Patent
Itaya

(10) Patent No.: US 12,092,981 B2
(45) Date of Patent: Sep. 17, 2024

(54) IMAGE FORMING APPARATUS

(71) Applicant: TOSHIBA TEC KABUSHIKI KAISHA, Tokyo (JP)

(72) Inventor: Satoshi Itaya, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/081,601

(22) Filed: Dec. 14, 2022

(65) Prior Publication Data

US 2023/0350331 A1 Nov. 2, 2023

(30) Foreign Application Priority Data

May 2, 2022 (JP) ................................. 2022-075839

(51) Int. Cl.
*G03G 15/00* (2006.01)

(52) U.S. Cl.
CPC ..... *G03G 15/5058* (2013.01); *G03G 15/5016* (2013.01); *G03G 15/5033* (2013.01)

(58) Field of Classification Search
CPC ........... G03G 15/5016; G03G 15/5033; G03G 15/5054; G03G 15/5058; G03G 15/5062
See application file for complete search history.

(56) References Cited

U.S. PATENT DOCUMENTS

| | | | | |
|---|---|---|---|---|
| 2007/0053710 A1* | 3/2007 | Shibaki | G03G 15/50 | 399/81 |
| 2014/0147132 A1 | 5/2014 | Kouzaki et al. | | |
| 2020/0310285 A1* | 10/2020 | Itou | G03G 15/5058 | |

FOREIGN PATENT DOCUMENTS

| | | |
|---|---|---|
| JP | 2007-188008 A | 7/2007 |
| JP | 2016-053678 A | 4/2016 |

* cited by examiner

*Primary Examiner* — Hoang X Ngo
(74) *Attorney, Agent, or Firm* — Kim & Stewart LLP

(57) ABSTRACT

An image forming apparatus includes an operation panel including a display, a belt through which an image formed thereon is transferred to a sheet, a head configured to form an image on the belt, and a controller configured to control the head to form an image on the belt according to operation settings. The controller is configured to, upon receipt of an instruction to execute a first job, determine whether the job includes forming an image, upon determining that the first job includes forming an image, determine whether a first condition for executing an adjustment operation to adjust the settings is satisfied, upon determining that the first condition is satisfied, control the display to display a screen through which execution of the adjustment operation and a timing thereof can be selected, and execute the first job and/or the adjustment operation based on a selection made through the screen.

18 Claims, 6 Drawing Sheets

IMAGE FORMING APPARATUS

CROSS-REFERENCE TO RELATED APPLICATION(S)

This application is based upon and claims the benefit of priority from Japanese Patent Application No. 2022-075839, filed May 2, 2022, the entire contents of which are incorporated herein by reference.

FIELD

Embodiments described herein relate generally to an image forming apparatus, a method for controlling an image forming apparatus, and a non-transitory computer readable medium storing a program executed on a computer.

BACKGROUND

Image forming apparatuses are widely used in various workplaces such as offices and homes.

The image quality of such an image forming apparatus changes depending on its operating condition. For this reason, image quality maintenance control for maintaining the required image quality is performed. It is preferable that the image quality maintenance control be executed immediately before the start of an image forming operation in order to form the image with the required image quality.

However, if the image quality maintenance control is executed after the necessity of performing the image forming operation arises, the image forming operation cannot be started until the image quality maintenance control ends, resulting in a waiting time.

In view of such circumstances, it has been desired to be able to perform the maintenance of image quality and shorten a waiting time for printing in a well-balanced manner.

SUMMARY OF THE INVENTION

Embodiments provide an image forming apparatus and an information processing program that can perform the maintenance of image quality and shorten a waiting time for printing in a well-balanced manner.

An image forming apparatus includes an operation panel including a display, a belt through which an image formed thereon is transferred to a sheet, a head configured to form an image on the belt, and a controller configured to control the head to form an image on the belt according to one or more operation settings. The controller is further configured to, upon receipt of an instruction to execute a first job via the operation panel, determine whether the first job includes forming an image on a sheet, upon determining that the first job includes forming an image on a sheet, determine whether a first condition for executing an adjustment operation to adjust the operation settings is satisfied, upon determining that the first condition is satisfied, control the display to display a first screen through which execution of the adjustment operation and a timing for executing the adjustment operation can be selected, and execute one or both of the first job and the adjustment operation based on a selection made through the first screen.

DETAILED DESCRIPTION

In this disclosure, an MFP with an image forming unit will be described with reference to the drawings.

Figure 1:
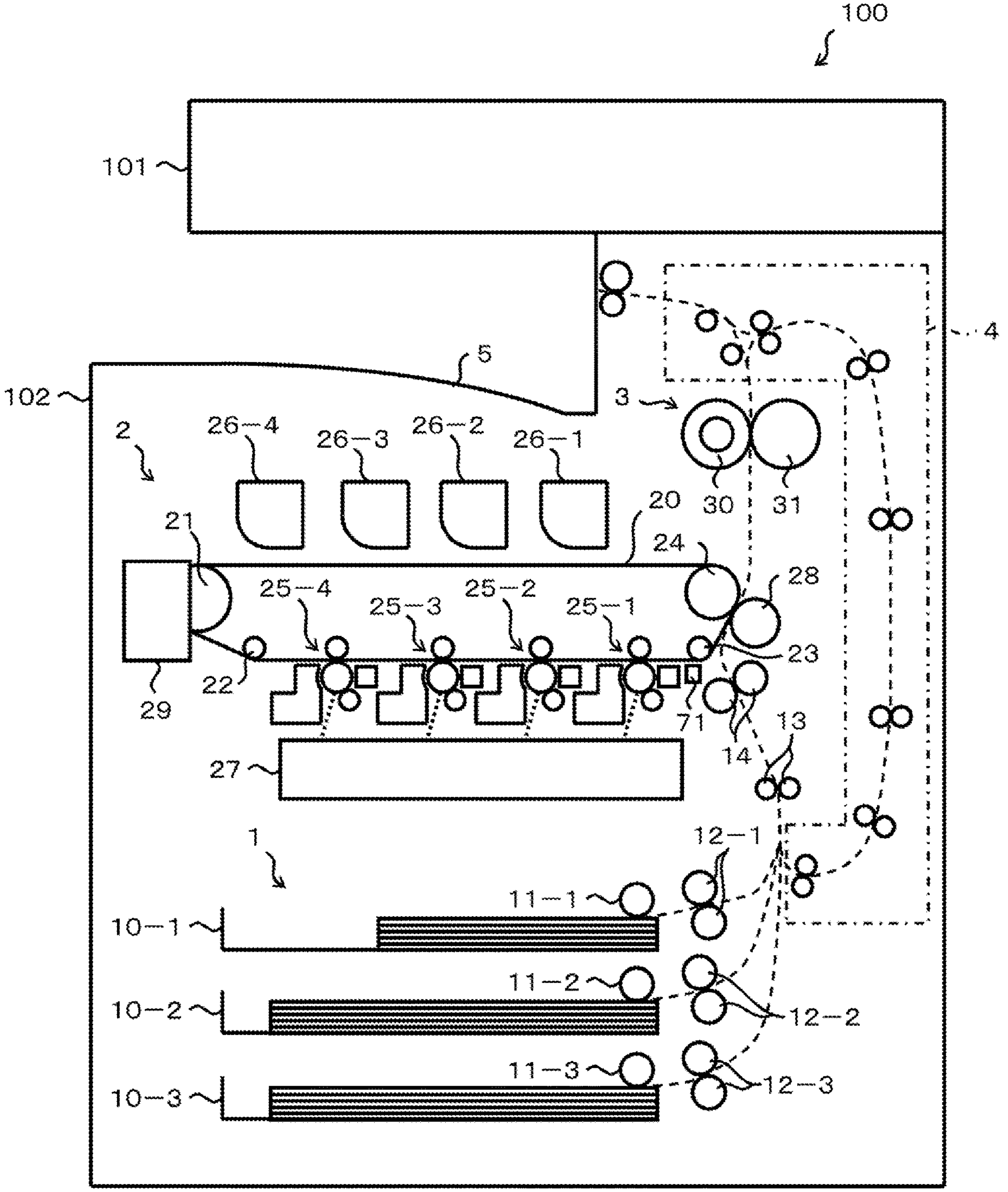
FIG. 1 is a diagram of a mechanical configuration of an MFP (multi-function peripheral) according to an embodiment.

First, a configuration of an MFP 100 according to an embodiment will be described. FIG. 1 is a diagram of a mechanical configuration of the MFP 100. It should be noted that FIG. 1 does not represent all the mechanical parts of the MFP 100, and the shapes and positional relationships of the components may differ from actual ones.

As shown in FIG. 1, the MFP 100 includes a scanner 101 and a printer 102. The scanner 101 reads an image formed on a document and generates image data corresponding thereto. The scanner 101 includes an image sensor such as a line sensor using a CCD (charge-coupled device), for example, to generate image data corresponding to a reflected light image from a reading surface of a document. The scanner 101 scans a document placed on the document table by the image sensor that moves along the document. The scanners 101 alternatively scan a document conveyed by an ADF (auto document feeder) with a fixed image sensor.

The printer 102 forms an image on a printing medium by an electrophotographic method. The medium is typically a print sheet such as a cut sheet. In the following description, a print sheet is used as the printing medium. However, as the medium, a sheet made of paper different from the cut paper may be used, or a sheet made of a material such as a resin other than paper may be used. The printer 102 has a color printing function of printing a color image on a print sheet and a monochrome printing function of printing a monochrome image on a print sheet. The printer 102 forms a color image by superimposing element images using toner of three colors, for example, yellow, magenta, and cyan, or four colors by adding black thereto. The printer 102 forms a monochrome image using, for example, black toner. However, the printer 102 may include only one of the color printing function and the monochrome printing function.

In the exemplary configuration illustrated in FIG. 1, the printer 102 includes a sheet feeding unit 1, a print engine 2, a fixing unit 3, an ADU (automatic duplexing unit) 4, and a sheet discharge tray 5. The sheet feeding unit 1 includes sheet feed cassettes 10-1, 10-2, and 10-3, pickup rollers 11-1, 11-2, and 11-3, conveyance rollers 12-1, 12-2, and 12-3, conveyance rollers 13, and registration rollers 14.

The sheet feed cassettes 10-1 to 10-3 store print sheets in a stacked state. The print sheets stored in the sheet feed cassettes 10-1 to 10-3 may be different types of print sheets having different sizes and materials, or may be the same type of print sheets. The sheet feeding unit 1 may further include a manual feed tray.

The pickup rollers 11-1 to 11-3 take out the print sheets one by one from each of the sheet feed cassettes 10-1 to 10-3. The pickup rollers 11-1 to 11-3 feed the taken-out print sheet to the conveyance rollers 12-1 to 12-3.

The conveyance rollers 12-1 to 12-3 feed the print sheet fed from the pickup rollers 11-1 to 11-3 to the conveyance rollers 13 via a conveying path formed by a guide member or the like (not shown).

The conveyance rollers 13 further convey the print sheet fed from any of the conveyance rollers 12-1 to 12-3, and feeds the sheet to the registration rollers 14.

The registration rollers 14 correct the inclination of the print sheet. The registration rollers 14 adjust the timing at which the print sheet is fed to the print engine 2.

The sheet feeding cassettes 10-1, 10-2, and 10-3, the pickup rollers 11-1, 11-2, and 11-3, and the conveyance rollers 12-1, 12-2, and 12-3 are not necessarily provided as three sets, and any number of sets of those components may be provided. In addition, if a manual feed tray is provided, it is not necessary to provide the paper feed cassette for the manual feed tray and the corresponding pickup roller and conveyance roller.

The print engine 2 includes a belt 20, support rollers 21, 22, 23, and 24, image forming units 25-1, 25-2, 25-3, and 25-4 each including a print head, supply units 26-1, 26-2, 26-3, and 26-4, an exposure unit 27, a transfer roller 28, and a belt cleaner 29. The belt 20 has an endless shape and is supported by support rollers 21, 22, 23, and 24 so as to maintain the shape as shown in FIG. 1. The belt 20 rotates counterclockwise in FIG. 1 as the support roller 21 rotates. The belt 20 temporarily carries an image of toner to be formed on a print sheet on the surface located on the outside (hereinafter referred to as the image bearing surface). That is, the belt 20 is an example of an image carrier. For example, semiconductive polyimide is used for the belt 20 in terms of heat resistance and abrasion resistance. The so-called sub-scanning is realized by the movement of the image bearing surface accompanying the rotation of the belt 20. The movement direction of the image bearing surface is also referred to as the sub-scanning direction.

Each of the image forming units 25-1 to 25-4 includes a photoconductor, a charger, a developing unit, a transfer unit, and a cleaner, and forms an image by an electrophotographic method in cooperation with the exposure unit 27. The transfer unit may be included in another unit such as a unit including the belt 20, not included in the image forming units 25-1 to 25-4, or may be present in a state not belonging to any of the units. The image forming units 25-1 to 25-4 are arranged along the belt 20 in a state in which the axial directions of the respective photoreceptors are parallel to each other. The image forming units 25-1 to 25-4 only differ in the color of the toner to be used, and the structure and operation thereof are the same. The image forming unit 25-1 forms an element image of black, for example. The image forming unit 25-2 forms, for example, a cyan element image. The image forming unit 25-3 forms, for example, a magenta element image. The image forming unit 25-4 forms, for example, a yellow element image. The image forming units 25-1 to 25-4 make the element images of the respective colors overlap each other on the image bearing surface of the belt 20. As a result, the image forming units 25-1 to 25-4 form a color image in which the respective element images of the respective colors are superimposed on the image bearing surface of the belt 20 at the time point of passing through the image forming unit 25-1.

Toner bottles containing toner are attachable to the supply units 26-1, 26-2, 26-3, and 26-4 that supply the toner contained in the attached toner bottles to the image forming units 25-1 to 25-4, respectively. The toner bottle may contain the toner alone as a so-called one-component developer, or may contain the toner and another substance such as a carrier as a so-called multicomponent developer in which the toner and the other substance are mixed. When the toner bottle contains such a multicomponent developer, the supply units 26-1, 26-2, 26-3, and 26-4 supply toner together with a material such as a carrier. However, a path through which the toner supplied from the supply units 26-1 to 26-4 to the image forming units 25-1 to 25-4 passes is omitted in FIG. 1.

The exposure unit 27 exposes the respective photoreceptors of the image forming units 25-1 to 25-4 in accordance with image data representing the element images of the respective colors. As the exposure unit 27, a laser scanner or an LED (light emitting diode) head or the like is used. If a laser scanner is used, the exposure unit 27 includes, for example, a semiconductor laser element, a polygon mirror, an imaging lens system, and a mirror. In this case, for example, the exposure unit 27 causes the laser beam emitted from the semiconductor laser element in accordance with the image data to be selectively incident on the respective photoconductors of the image forming units 25-1 to 25-4 by switching the emission direction by the mirror. The exposure unit 27 scans the laser beam in the axial direction of the photoreceptor (i.e., the depth direction in FIG. 1) by a polygon mirror. This scanning of the laser beam is a so-called main scanning, the direction of which is called the main scanning direction.

The transfer roller 28 is disposed parallel to the support roller 24, and sandwiches the belt 20 with the support roller 24. The transfer roller 28 sandwiches the print sheet fed from the registration roller 14 between the print sheet and the image bearing surface of the belt 20. The transfer roller 28 transfers the image of the toner formed on the image bearing surface of the belt 20 to the print sheet by using an electrostatic force. The belt cleaner 29 removes the toner remaining on the image bearing surface of the belt 20 without being transferred to the print sheet.

Thus, the print engine 2 forms an image on the print sheet fed by the registration roller 14 by an electrophotographic method.

The fixing unit 3 includes a fixing roller 30 and a pressure roller 31.

The fixing roller 30 houses a heater inside a heat-resistant metal roller, for example. The heater is, for example, an IH (induction heating) heater, but any other type of heater can be used as appropriate. The fixing roller 30 fixes the toner on the print sheet by melting the toner adhering to the print sheet conveyed from the print engine 2.

The pressure roller 31 is provided in parallel with the fixing roller 30 and in a state of being pressed against the fixing roller 30. The pressure roller 31 sandwiches the print sheet fed from the print engine 2 with the fixing roller 30 and presses the sheet against the fixing roller 30.

The ADU 4 includes a plurality of rollers and selectively performs the following two operations. In the first operation, the print sheet that has passed through the fixing unit 3 is directly fed toward the sheet discharge tray 5. This first operation is performed when single-sided printing or double-sided printing is completed. In the second operation, the print sheet that has passed through the fixing unit 3 is once conveyed to the side of the sheet discharge tray 5, and then is switched back to be fed to the print engine 2. This second operation is performed when image formation on only one surface is completed in double-sided printing.

The sheet discharge tray 5 receives the print sheet on which an image is formed and discharged.

Figure 2:
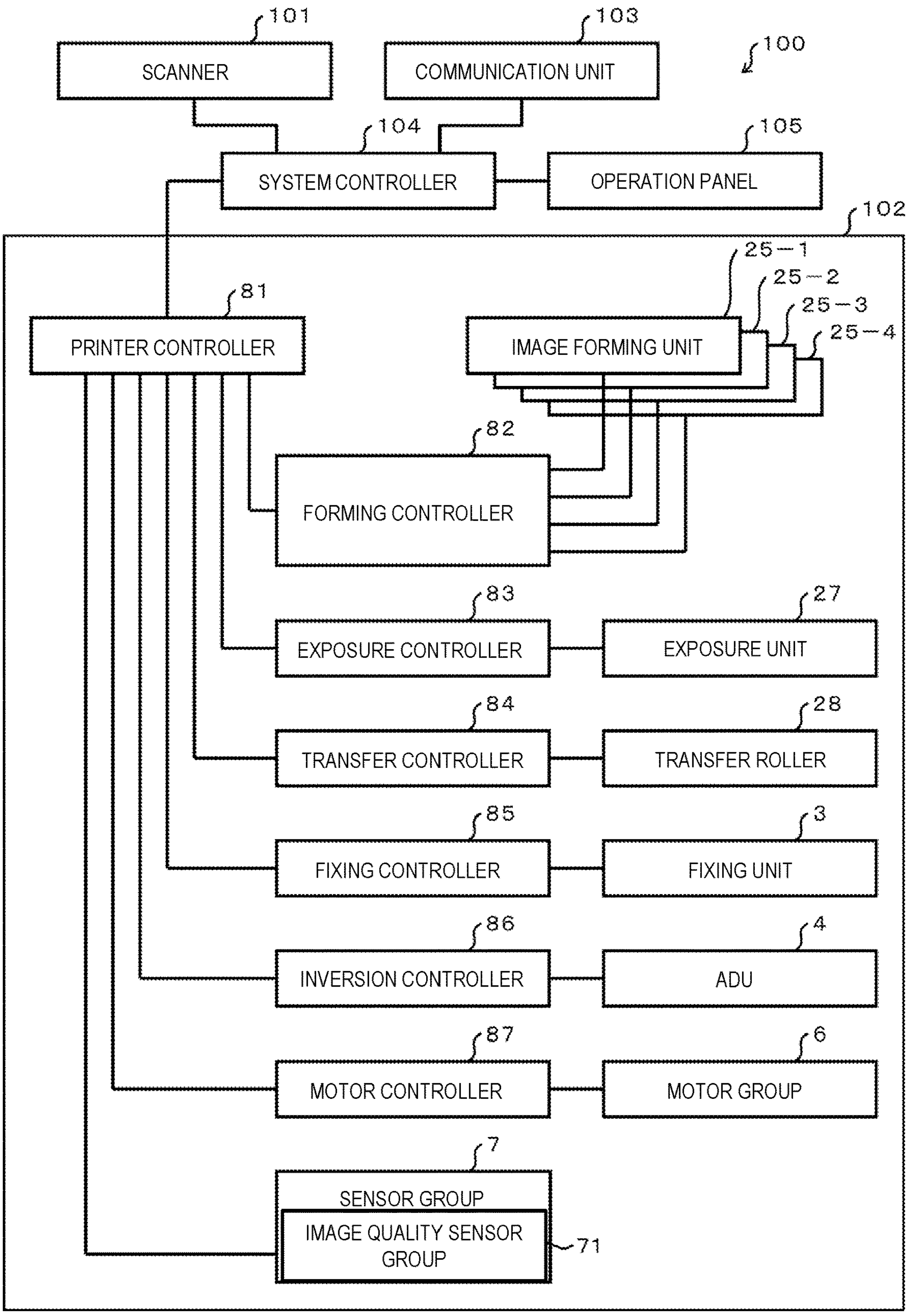
FIG. 2 is a hardware block diagram of the MFP.

FIG. 2 is a hardware block diagram of the MFP 100. In FIG. 2, the same elements as those shown in FIG. 1 are denoted by the same reference numerals, and the descriptions thereof will not be repeated.

The MFP 100 includes, in addition to the scanner 101 and printer 102, a communication unit 103, a system controller 104, and an operation panel 105.

The communication unit 103 is a network interface circuit that performs a process for communicating with an information terminal such as a computer device and an imaging terminal such as a facsimile device via a communication network such as a LAN (local area network) and a public communication network.

The system controller 104 controls the units constituting the MFP 100 in order to perform various operations as the MFP 100 including, but not limited to, scanning and printing.

The operation panel 105 includes an input device and a display device. The operation panel 105 receives an instruction from an operator through the input device. The operation panel 105 displays various types of information to be notified to the operator by the display device. As the operation panel 105, for example, a touch panel, various switches, various lamps, and the like can be used alone or in combination as appropriate.

The fixing unit 3, the ADU 4, the image forming units 25-1 to 25-4, the exposure unit 27, and the transfer roller 28 are included in the printer 102. In addition, the printer 102 includes a motor group 6. The motor group 6 includes a plurality of motors for rotating various rotors included in the pickup rollers 11-1 to 11-3, the conveyance rollers 12-1 to 12-3, the conveyance rollers 13, the registration rollers 14, the support rollers 21, the transfer rollers 28, the fixing rollers 30, the image forming units 25-1 to 25-4, and rollers included in the ADU 4.

The printer 102 further includes a sensor group 7, a printer controller 81, a forming controller 82, an exposure controller 83, a transfer controller 84, a fixing controller 85, an inversion controller 86, and a motor controller 87.

The sensor group 7 includes various sensors for monitoring the operation state of each component of the printer 102. The sensor group 7 includes an image quality sensor group 71.

As illustrated in FIG. 1, the image quality sensor group 71 is disposed so as to face a region of the image bearing surface of the belt 20 located between the image forming unit 25-1 and the transfer roller 28. The image quality sensor group 71 includes a plurality of sensors for measuring the density and the formation position of the image formed on the image bearing surface of the belt 20. For example, the image quality sensor group 71 includes three density sensors arranged in the main scanning direction at three positions on the front side, the center, and the rear side of the belt 20. The density sensor is, for example, a reflection-type optical sensor that measures the amount of reflected light from the image bearing surface of the belt 20.

Under the control of the system controller 104, the printer controller 81 controls each unit constituting the printer 102 in order to the operation as the printer 102.

The forming controller 82, the exposure controller 83, the transfer controller 84, the fixing controller 85, the inversion controller 86, and the motor controller 87 all operate under the control of the printer controller 81 to control the operations of the image forming units 25-1 to 25-4, the exposure unit 27, the transfer roller 28, the ADU 4, and the motor group 6, respectively.

Figure 3:
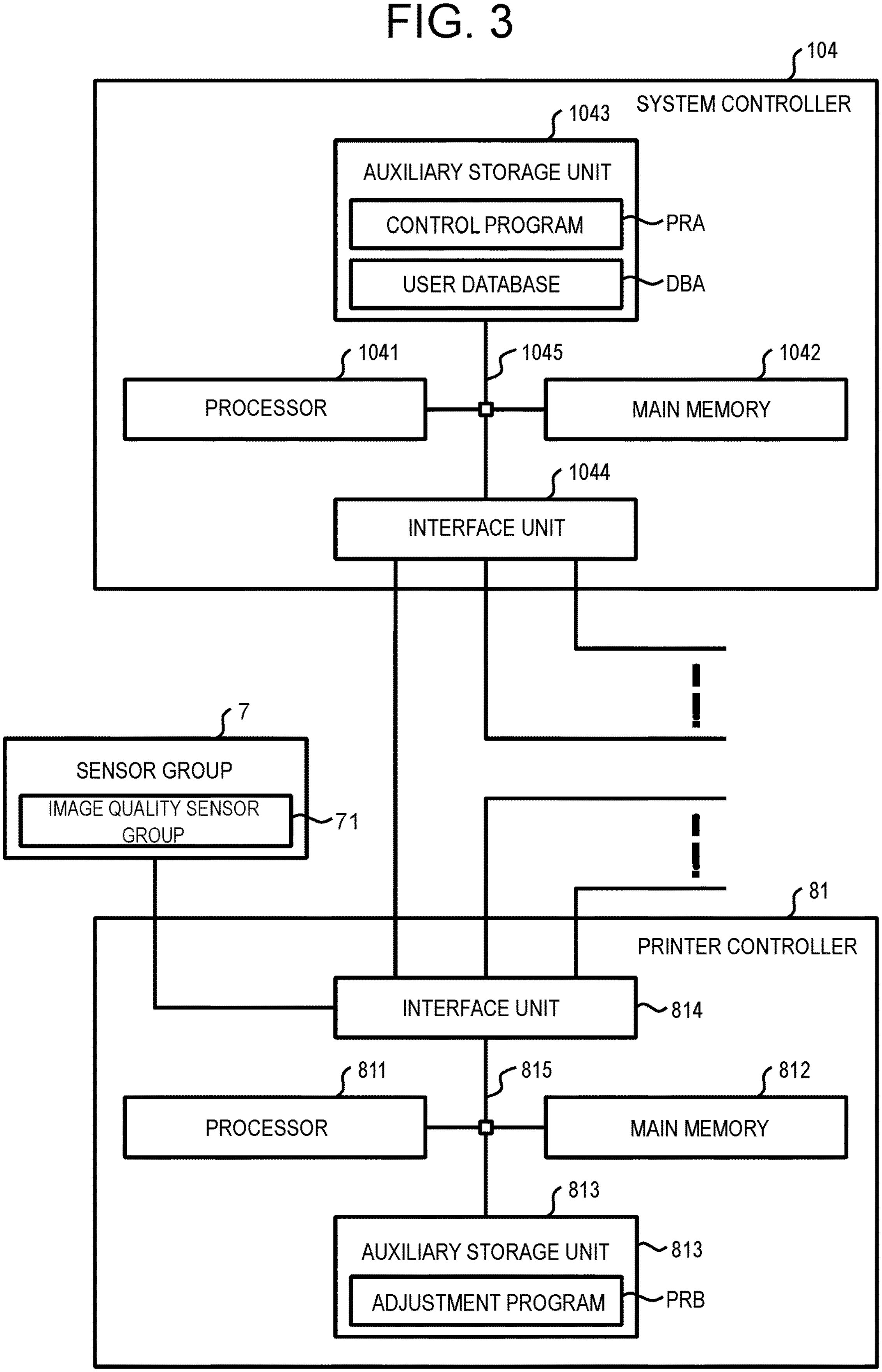
FIG. 3 is a hardware block diagram of a system controller and a printer controller of the MFP.

FIG. 3 is a hardware block diagram of the system controller 104 and the printer controller 81.

The system controller 104 includes a processor 1041, a main memory 1042, an auxiliary storage unit 1043, an interface unit 1044, and a transmission path 1045.

The processor 1041 is connected to the main memory 1042 and the auxiliary storage unit 1043 via the transmission path 1045 to perform information processing for controlling the units constituting the MFP 100. The processor 1041 executes information processing to be described later in accordance with one or more programs such as an operating system, middleware, and an application program.

The main memory 1042 includes a read-only memory area and a rewritable memory area. In the main memory 1042, one or more of the information processing programs are stored in the read-only memory area. In the main memory 1042, the data necessary for the processor 1041 to execute processing for controlling each unit of the MFP 100 is stored in the read-only memory area or the rewritable memory area. The rewritable memory area of the main memory 1042 is used as a work area for the processor 1041.

The auxiliary storage unit 1043 is a storage device such as an EEPROM (electric erasable programmable read-only memory), an HDD (hard disc drive), and an SSD (solid state drive), or any combination thereof. The auxiliary storage unit 1043 stores data used by the processor 1041 to perform various types of processing and data generated by processing by the processor 1041. The auxiliary storage unit 1043 may store the programs to be executed by the processor 1041. In an embodiment, the auxiliary storage unit 1043 stores a control program PRA. The control program PRA is a program for controlling the MFP 100. The auxiliary storage unit 1043 also stores a user database DBA. The user database DBA is a database for managing the users of the MFP 100. The user database DBA is associated with the user code as the identifier for each of the users, and includes setting data representing settings related to the use of the MFP 100 by the user.

The interface unit 1044 mediates data exchange with the scanner 101, the communication unit 103, the operation panel 105, and the printer controller 81.

The printer controller 81 includes a processor 811, a main memory 812, an auxiliary storage unit 813, an interface unit 814, and a transmission path 815.

The processor 811 is connected to the main memory 812 and the auxiliary storage unit 813 via the transmission path 815 to perform information processing for controlling each unit of the printer 102. The processor 811 executes information processing to be described later in accordance with one or more information processing programs such as an operating system, middleware, and an application program.

The main memory 812 includes a read-only memory area and a rewritable memory area. In the main memory 812, one or more of the information processing programs are stored in the read-only memory area. In the main memory 812, the data necessary for the processor 811 to execute processing for controlling each unit of the printer 102 in the read-only memory area or the rewritable memory area. The rewritable memory area of the main memory 812 is used as a work area for the processor 811.

The auxiliary storage unit 813 is a storage device such as an EEPROM, an HDD and an SSD, or any combination thereof. The auxiliary storage unit 813 stores data used by the processor 811 to perform various types of processing and data generated by processing by the processor 811. The auxiliary storage unit 813 may store the programs to be executed by the processor 811. In an embodiment, the secondary storage unit 813 stores an adjustment program PRB. The adjustment program PRB is a program for performing an adjustment operation for maintaining image quality.

The interface unit 814 mediates data exchange between the system controller 104, the sensor group 7, the forming controller 82, the exposure controller 83, the transfer controller 84, the fixing controller 85, the inversion controller 86, and the motor controller 87.

Next, the operation of the MFP 100 configured as described above will be described. The various operations and various kinds of processing described below are examples, and one or more of the described steps and the execution order thereof can be changed, one or more of the steps can be omitted, and/or another step can be added as appropriate.

In the following description, an operation different from the operation typically performed by the same type of conventional MFP will be mainly described, and that conventional operation will not be described. The operation of the MFP 100 in an embodiment is executing the adjustment operation for maintaining the image quality.

First, the adjustment operation to be the target of the execution control will be briefly described.

The density and the tone reproducibility of the element images formed by the image forming units 25-1 to 25-4 vary depending on, for example, variations in the development contrast potential, the exposure amount, the ratio of the screen in the processing of the image data, and the like. The density and tone reproducibility of the element images formed by the image forming units 25-1 to 25-4 also vary depending on the influence of prerequisites in image formation, such as the surrounding environment or the degree of deterioration of the photoconductor and the belt 20. In addition, the relative positional relationship of the element images formed by the image forming units 25-1 to 25-4 may vary. The image quality of the image formed by the printer 102 varies due to the influence of these variations. The operation for compensating for such variations in image quality and maintaining a predetermined image quality is referred to as the adjustment operation for maintaining image quality.

More specifically, the adjustment operation includes, for example, an operation of measuring the state of formation of a test pattern on the image bearing surface of the belt 20 using the image quality sensor group 71 and adjusting the operating conditions or operation settings (e.g., parameters) of the image forming units 25-1 to 25-4 (e.g., density of toner in the respective developers, potential of the respective chargers, potential of the respective developers, exposure amount to the respective photoconductors, etc.) so that the test pattern is printed as expected. Therefore, a job using the printer 102 cannot be executed while the adjustment operation is being executed.

The adjustment operation is executed by, for example, the processor 811 according to the adjustment program PRB to operate the units of the printers 102.

When the MFP 100 is in an operating condition that allows the printers 102 to execute jobs involving imaging, the processor 1041 in the system controller 104 executes a control process for controlling the execution of the adjustment operation based on the control program PRA.

Figure 4:
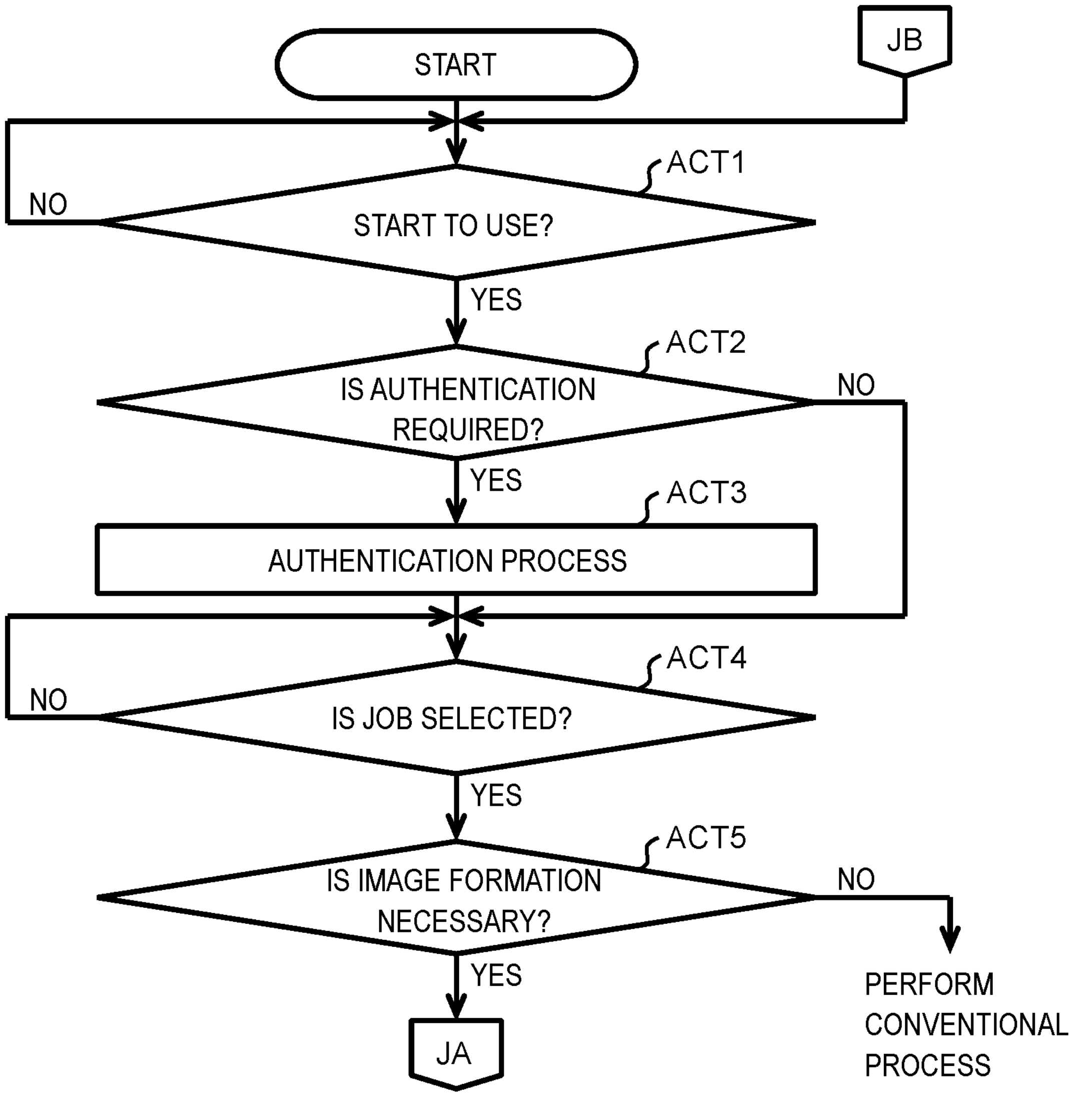
FIGS. 4 and 5 are flowcharts of a control process performed by the system controller.
Figure 5:
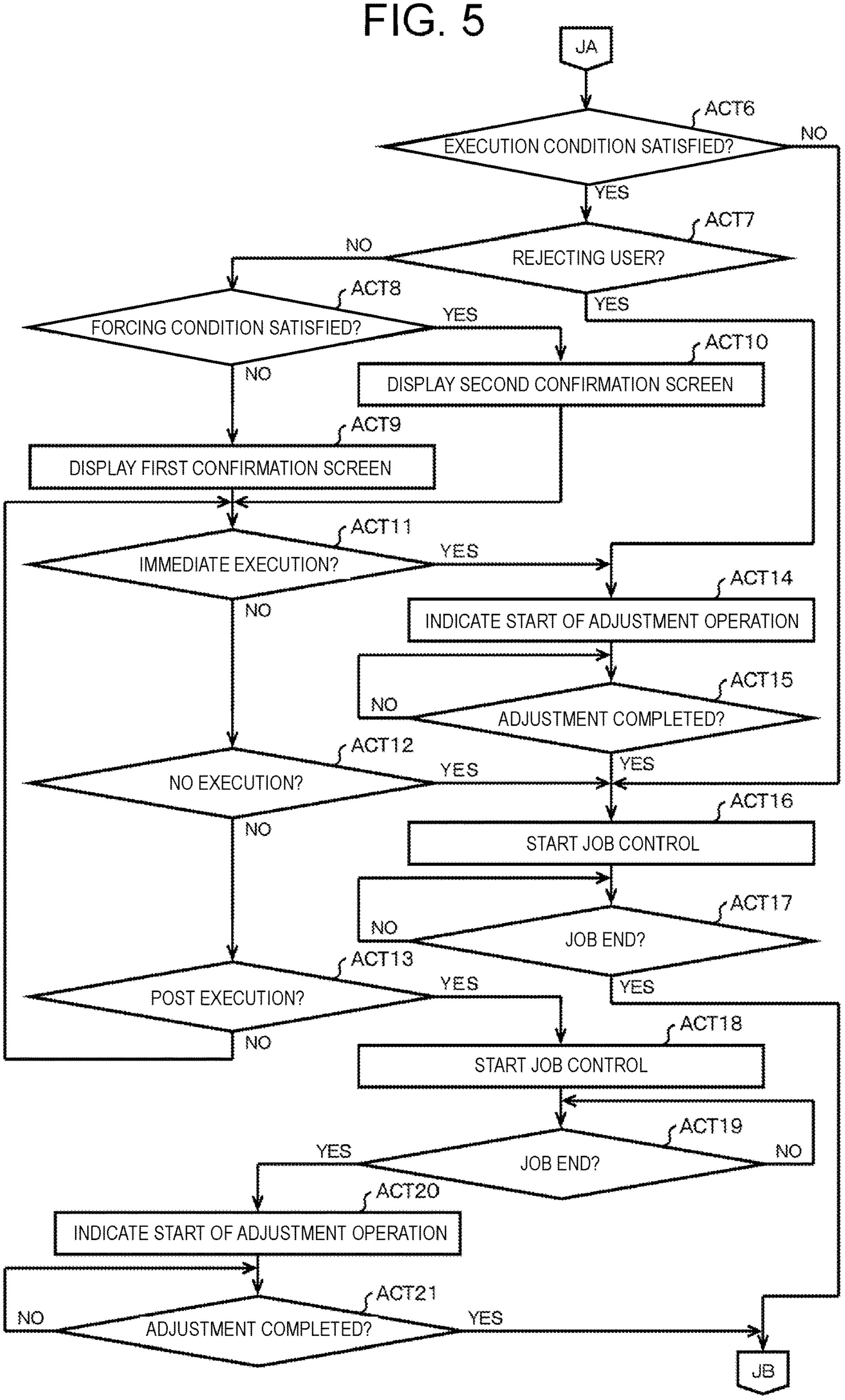

FIG. 4 and FIG. 5 are flowcharts of the control process executed by the processor 1041.

When the MFP 100 does not need to execute any jobs, the processor 1041 waits for the use of the MFP 100 to start in ACT 1. Then, when a predetermined event occurs, the processor 1041 determines YES for the start of use and proceeds to ACT 2. For example, the processor 1041 determines that the use has started in response to the detection of a tap operation on the touch panel included in the operation panel 105. The processor 1041 determines that the use has started, for example, when an ID (identification) card is detected by a card reader connected to the system controller 104 (not shown in FIG. 2). For example, the processor 1041 determines that the use has started when a human body is detected by a human sensor connected to the system controller 104 (not shown in FIG. 2). The occurrence of any event can be determined as the start of use of the MFP 100.

In ACT 2, the processor 1041 checks whether an operator authentication is required. The processor 1041 then determines YES if the operator authentication is required and proceeds to ACT 3. The processor 1041 determines that the operator authentication is required, for example, based on the operation setting of the MFP 100. For example, the processor 1041 determines that the operator authentication is required when the operation setting allows the operator authentication by an ID card and the ID card is read by the card reader. Additionally, the processor 1041 determines that the operator authentication is required, for example, when a predetermined operation that requires the operator authentication is performed on the operation panel 105. It should be noted that in what cases the operator authentication is required may be appropriately determined by, for example, a designer of the MFP 100.

In ACT 3, the processor 1041 executes the authentication process for the operator. The authenticating process is a process for specifying which user among a plurality of pre-registered users is operating the MFP 100. The authentication process may be performed according to any well-known technique such as password authentication and biometrics authentication. Upon completion of the authenticating process, the processor 1041 proceeds to ACT 4. If the authentication fails, the processor 1041 may return to ACT 1, a standby status or the like, so as not to proceed to ACT 4. If the operator authentication is not required, the processor 1041 determines NO in ACT 2, skips ACT 3, and proceeds to ACT 4.

In ACT 4, the processor 1041 waits for a job to be selected. Then, the processor 1041 determines YES when a job is selected by, for example, a predetermined operation on the operation panel 105, and proceeds to ACT 5.

In ACT 5, the processor 1041 checks whether images need to be formed using the printer 102 when executing the selected job. Then, the processor 1041 determines NO if the job that does not require image-forming, such as a scan job, is selected, and proceeds to a process different from the process described later in order to execute the job. The process in this case may be the same as the process in another conventional MFP, for example, and will not be described here. On the other hand, if a job that needs image-forming, such as a printing or a copying, is selected, the processor 1041 determines YES and proceeds to ACT 6 in FIG. 5.

In ACT 6, the processor 1041 checks whether an execution condition of the adjustment operation is satisfied. The execution condition is determined in advance so that the image quality of the image formed by the printer 102 is expected to deteriorate or is satisfied a little earlier. The execution condition may be appropriately determined by, for example, a designer or an administrator of the MFP 100.

Some examples of the execution condition are described below. For example, the execution condition is satisfied when a time that has elapsed after the end of the previous image forming operation exceeds a predetermined time, for example, 15 minutes. The execution condition is satisfied when the difference between the airframe temperature during the last execution of the adjustment operation and the current airframe temperature exceeds a predetermined temperature difference, such as 1° C. The execution condition is satisfied when the relative change between the humidity inside the printer 102 during the last adjustment operation and the current humidity exceeds a predetermined amount of change, such as 10%. The execution condition is satisfied when the total number of images formed since the last execution of the adjustment operation exceeds a predetermined number of images such as 1000 sheets. The execution condition is satisfied when the MFP 100 is in a state immediately after returning from the toner empty state. The processor 1041 determines that the execution condition is satisfied when one or more of the above-recited conditions are satisfied.

If the execution condition is satisfied, the processor 1041 determines YES in ACT 6, and proceeds to ACT 7.

In ACT 7, the processor 1041 checks whether the user is a rejecting user. The rejecting user is a user who has declared in advance that he/she refuses the execution of a confirmation operation to be described later. Whether the user is a rejecting user is indicated in the user database DBA. For example, when the operator is successfully authenticated in ACT 3, the processor 1041 refers to the user database DBA, and when the user code of the authenticated operator or user is not marked as a rejecting user, it is determined NO and proceeds to ACT 8.

In ACT 8, the processor 1041 checks whether a forcing condition is satisfied. The forcing condition will be described later. If the forcing condition is not satisfied, the processor 1041 determines NO in ACT 8 and proceeds to ACT 9.

In ACT 9, the processor 1041 causes the display device included in the operation panel 105 to display a first confirmation screen, for example. For example, the processor 1041 causes the first confirmation screen to be displayed as a pop-up screen superimposed on the screen already displayed on the device. The first confirmation screen is an operation screen for causing the operator to select whether to execute the adjustment operation. The first confirmation screen also allows the operator to select whether the timing at which the adjustment operation is to be executed is before or after the start of the job.

Figure 6:
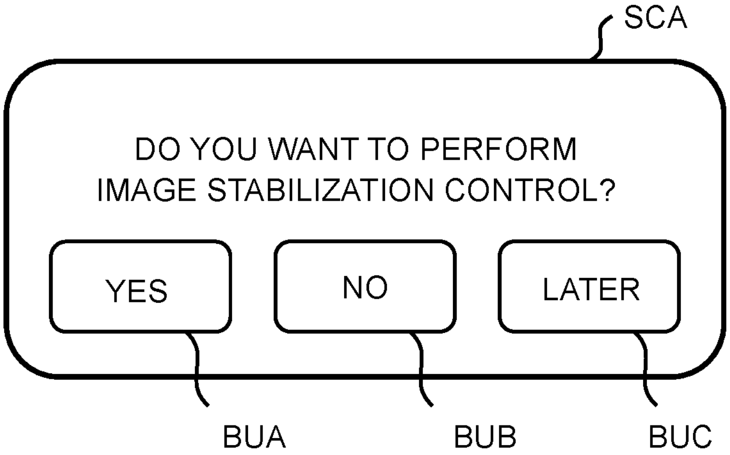
FIG. 6 is a diagram of a first confirmation screen.

FIG. 6 is a diagram of an exemplary first confirmation screen SCA.

The first confirmation SCA indicates a text message regarding the adjustment operation and buttons BUA, BUB, and BUC for prompting the user to select one of the buttons. The "image stabilization control" in the text message refers to the adjustment operation. The button BUA is a soft key for the operator to specify that the adjustment operation is to be executed prior to starting the job (hereinafter referred to as "immediate execution"). The button BUB is a soft key for the operator to specify that the adjustment operation is not to be executed (hereinafter, referred to as "no execution"). The button BUC is a soft key for the operator to designate the execution of the adjustment operation after the completion of the job (hereinafter referred to as "post execution").

If the operator prefers the immediate operation, for example, in a case where the operator does not want the image quality to be degraded in the image formation performed in the job to be executed, the operator taps the button BUA. For example, when the operator accepts the image quality degradation in the image formation performed in the job to be executed and desires that the job to be started quickly, the operator taps the button BUB or BUC.

The processor 1041 proceeds to ACT 11 with the first confirmation screen displayed. In ACT 11, the processor 1041 checks whether the immediate execution has been selected. The processor 1041 determines NO if the corresponding event cannot be confirmed, and proceeds to ACT 12.

In ACT 12, the processor 1041 checks whether the no execution has been selected. The processor 1041 determines NO if the corresponding event cannot be confirmed, and proceeds to ACT 13.

In ACT 13, the processor 1041 checks whether the post execution has been selected. The processor 1041 then determines NO if the event cannot be ascertained and returns to ACT 11.

Thus, the processor 1041 waits for ACT 11 to ACT 13 through which the immediate execution, no execution, or the post execution is selected. Then, if the processor 1041 determines that the immediate execution has been selected as described above, it determines YES in ACT 11 and proceeds to ACT 14. If it is determined that the user is a rejecting user, the processor 1041 determines YES in ACT 7, and skips ACT 8 to ACT 11, that is, proceeds to ACT 14 without waiting for the selection by the operator.

In ACT 14, the processor 1041 instructs the printer controller 81 to initiate the adjustment operation. In response to this instruction, the processor 811 in the printer controller 81 executes information processing for the adjustment operation based on the adjustment program PRB.

In ACT 15, the processor 1041 awaits completion of the adjustment operation. The processor 1041 determines YES when the adjustment operation under the control of the processor 811 is completed, and proceeds to ACT 16.

If the processor 1041 determines NO in ACT 6 because the execution condition is not satisfied, the process proceeds to ACT 16 without executing ACT 7 to ACT 15. If no execution is selected in ACT 11 to ACT 13, the processor 1041 determines YES in ACT 12, and proceeds to ACT 16 without executing ACT 14 and ACT 15. In other words, in these cases, ACT 16 is performed without executing the adjustment operation.

In ACT 16, the processor 1041 starts a control process (hereinafter, referred to as job control) for executing the job selected in ACT 4. The processor 1041 executes the job control as a process of a thread different from the control process illustrated in FIGS. 4 and 5, for example. In ACT 17, the processor 1041 waits for the job to be completed under job control. When the job is completed, the processor 1041 determines YES, and returns to the standby status of ACT 1 in FIG. 4.

On the other hand, if the post execution is selected in ACT 11 to ACT 13, the processor 1041 determines YES in ACT 13 and proceeds to ACT 18.

In ACT 18, the processor 1041 starts the job control as in ACT 16.

In ACT 19, the processor 1041 waits for the job to be completed, like ACT 17. When the job is completed, the processor 1041 determines YES and proceeds to ACT 20.

In ACT 20, the processor 1041 instructs the printer controller 81 to initiate the adjustment operation in the same manner as in ACT 14.

In ACT 21, the processor 1041 waits for the adjustment operation to be completed, like ACT 15. Then, the processor 1041 determines YES when the adjustment operation is completed, and returns to the standby status of ACT 1 in FIG. 4.

When the processor 1041 determines that the forcing condition is satisfied in ACT 8, it proceeds to ACT 10. The forcing condition is determined in advance to be satisfied when the adjustment operation has not been executed for a certain period after no execution was continuously selected. The forcing condition may be appropriately determined by, for example, a designer or an administrator of the MFP 100.

The forcing condition is satisfied, for example, when the selection of no execution has been repeated consecutively a predetermined number of times in ACT 11 to ACT 13. In this case, the processor 1041 counts up the count value when it is determined as YES in ACT 12, for example, and resets the count value when ACT 14 or ACT 20 is executed. Then, if the counted value has reached the predetermined number, the processor 1041 determines YES in ACT 8.

Additionally, the forcing condition is satisfied, for example, when the elapsed time from the previous execution of ACT 14 or ACT 20 has reached a predetermined time. For example, the processor 1041 measures the elapsed time after ACT 14 or ACT 20 is executed. Then, the processor 1041 determines YES in ACT 8 when the measured elapsed time exceeds the predetermined time.

In ACT 10, the processor 1041 causes a second confirmation screen to be displayed on, for example, the display device included in the operation panel 105. For example, the processor 1041 causes the second confirmation screen to be displayed as a pop-up screen superimposed on the screen already displayed on the display device. The second confirmation screen is an operation screen for causing the operator to select a timing at which the adjustment operation is to be executed before or after the start of the job.

Figure 7:
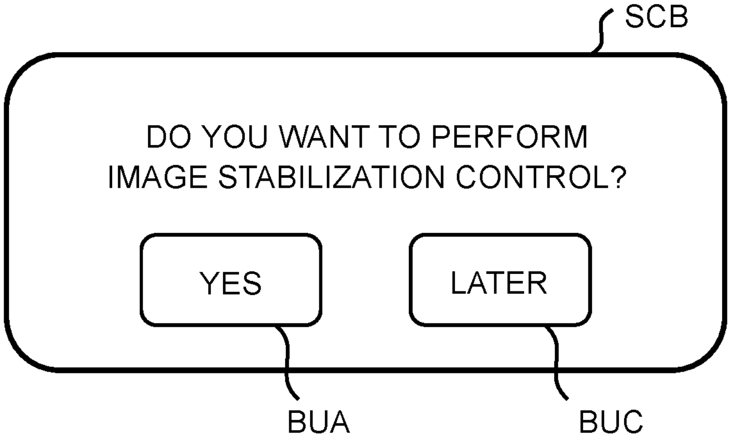
FIG. 7 is a diagram of a second confirmation screen.

FIG. 7 is a diagram of an exemplary second confirmation screen SCB.

The second confirmation SCB indicates a text message regarding the adjustment operation and buttons BUA and BUC for prompting the user to select one of the buttons. That is, the second confirmation screen SCB is a screen in which the button BUB is omitted from the first confirmation screen SCA.

After the second confirmation screen is displayed in ACT 10, the processor 1041 proceeds to ACT 11 to ACT 13. However, since the second confirmation screen does not allow the user to select no execution, the processor 1041 does not determine YES in ACT 12 while the second confirmation screen is being displayed. Accordingly, the processor 1041 proceeds to either ACT 14 or ACT 20 to perform the adjustment operation.

In this way, the processor 1041 causes the adjustment processing to be executed before the start of the job accompanied by the image formation, that is, before the start of the image formation, in the case where the immediate execution is selected. That is, in response to a selection by the operator, the processor 1041 determines whether to execute the adjustment operation prior to starting the image forming.

The processor 1041 causes the adjustment operation to be executed after the completion of the image formation when the post execution, which is one of the options that does not execute the adjustment operation before the start of the image formation, is selected.

Further, the processor 1041 determines that the adjustment operation is not executed before the start of image formation when the post execution or no execution is selected. Then, the processor 1041 determines whether to execute the adjustment operation after the end of the image formation in accordance with the selection.

Further, when the forced condition is satisfied, the processor 1041 does not accept a selection for skipping the adjustment operation. Thus, the processor 1041 executes the adjustment operation before or after the image formation.

In addition, when the operator is a rejecting user, the processor 1041 does not accept the selection regarding the execution of the adjustment operation, and causes the adjustment operation to be executed at any predetermined timing before and after the image formation.

As described above, when the MFP 100 needs to start the image formation by the printer 102 in a situation where the execution condition is satisfied, the operator is allowed to specify whether to execute the adjustment operation prior to the start of the image formation. Then, the MFP 100 determines whether to execute the adjustment operation prior to starting the imaging, according to the operator's selection. Thus, if the operator prefers image quality, it is possible to perform the adjustment operation before the start of image formation. On the other hand, if the operator prefers speed in the image formation, the completion of the image formation can be accelerated by promptly starting the image formation without performing the adjustment operation. Thus, according to the MFP 100, it is possible to realize the image quality maintenance and the shortening of the waiting time in a well-balanced manner according to the user's needs.

When the post adjustment operation is selected, the MFP 100 starts the image formation, and then executes the adjustment operation after the completion of the image formation. Thus, if there is an idle time before the next image formation needs to be initiated, the adjustment operation can be performed during that time.

In addition, the MFP 100 determines whether to execute the adjustment operation after the completion of the image formation in accordance with the selection by the operator when the adjustment operation is not executed prior to the beginning of the image formation. Thus, for example, in a case where the operator wants to quickly repeat the image formation a plurality of times, the adjustment operation is not executed after the completion of the image formation, so that such user needs can be satisfied.

In addition, the MFP 100 does not accept the selection for not executing the adjustment operation if the forcing condition is satisfied. As a result, it is possible to prevent the adjustment operation from being not executed for a long period of time and to prevent the image quality from being extremely deteriorated.

When the operator is a rejecting user, the MFP 100 performs the adjustment operation prior to starting the imaging without accepting any selection by the operator. Thus, the operator who does not want to confirm whether the adjustment operation is to be executed in order to secure image quality can skip the selection screen regarding the execution of the adjustment operation by being registered as a rejecting user in advance.

Various modifications can be made to the above-described examples as follows.

When the execution condition is satisfied, only one of the immediate execution and the post execution may be selected. In this case, when the processor 1041 determines NO in ACT 7, the process proceeds to ACT 10, and ACT 8, ACT 9 and ACT 12 are not performed.

When the execution condition is satisfied, no execution may always be automatically selected. In this case, for example, the processor 1041 proceeds to ACT 9 when determining NO in ACT 7, and ACT 8 and ACT 10 are not performed.

In the case where the operator is a rejecting user, the post execution may be automatically selected. In this situation, the processor 1041 proceeds to ACT 18, for example, in response to the determination of YES in ACT 7.

If the operator is a rejecting user, no execution may be automatically selected. In this situation, the processor 1041 proceeds to ACT 16, for example, in response to the determination of YES in ACT 7.

For each rejecting user, one of the immediate execution, the post execution, and no execution may be selected in advance. In this case, the processor 1041 confirms the setting of the user who is the operator in response to the determination of YES by ACT 7, and automatically proceeds to ACT 14 if the immediate execution is selected, to ACT 16 if no execution is selected, to proceed to ACT 18 if the post execution is selected.

Regardless of which user the operator is, a selection regarding the execution of the adjustment operation may be accepted. In this instance, the processor 1041 proceeds to either ACT 8, ACT 9 or ACT 10, for example, in response to the determination of YES in ACT 6.

If the selected job to be executed includes an operation other than image formation, that operation may be started before completion of the adjustment operation. For example, if the execution target is a copy job, the processor 1041 may cause the document reading operation while performing the adjustment operation in parallel.

The above-described process can be performed by various image forming apparatuses other than the MFP 100, such as copying machines, printers, and facsimile apparatuses.

The number of the image forming units is not limited to four, and may be at least one.

For example, the printer 102 may form an image by a method different from an electrophotographic method such as an ink jet method.

Each of the functions performed by the processor 1041 may be performed by hardware such as a logic circuit or the like. Each of the above-described functions can also be performed by combining software control with hardware such as the above-described logic circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus, comprising:

an operation panel including a display;

a belt through which an image formed thereon is transferred to a sheet;

a head configured to form an image on the belt; and a controller configured to control the head to form an image on the belt according to one or more operation settings, wherein the controller is further configured to:

upon receipt of an instruction to execute a first job via the operation panel, determine whether the first job includes forming an image on a sheet, upon determining that the first job includes forming an image on a sheet, determine whether a first condition for executing an adjustment operation to adjust the operation settings is satisfied, upon determining that the first condition is satisfied, control the display to display a first screen through which execution of the adjustment operation and a timing for executing the adjustment operation can be selected, and execute one or both of the first job and the adjustment operation based on a selection made through the first screen, wherein the first condition is satisfied when:

a predetermined time has elapsed after a previous image formation, a difference between humidity during the previous image formation and current humidity exceeds a predetermined value, a number of sheets printed after a previous adjustment operation exceeds a predetermined number, or the image forming apparatus has recovered from a toner empty state.

2. The image forming apparatus according to claim 1, wherein the timing for executing the adjustment operation is either a first timing when the adjustment operation is executed before the first job or a second timing when the adjustment operation is executed after the first job.

3. The image forming apparatus according to claim 2, wherein the first screen includes a first button for selecting the first timing, a second button for selecting the second timing, and a third button for not executing the adjustment operation.

4. The image forming apparatus according to claim 2, wherein the controller is further configured to:

determine whether a second condition for forcing execution of the adjustment operation is satisfied, and upon determining that the second condition is satisfied, control the display to display, instead of the first screen, a second screen through which either the first timing or the second timing can be selected.

5. The image forming apparatus according to claim 4, wherein the second condition is satisfied when a predetermined time has elapsed after a previous adjustment operation.

6. The image forming apparatus according to claim 4, wherein the second screen includes a first button for selecting the first timing and a second button for selecting the second timing.

7. The image forming apparatus according to claim 1, further comprising:

a memory that stores user information, wherein the controller is further configured to identify a user who has operated the operation panel, and execute the adjustment operation before the first job without displaying the first screen based on the user information.

8. The image forming apparatus according to claim 1, wherein the controller is further configured to, when the first job includes an operation other than forming an image on a sheet, execute the operation and the adjustment operation in parallel.

9. The image forming apparatus according to claim 1, further comprising:

a sensor, wherein the controller is further configured to execute the adjustment operation by controlling the head to form a test pattern on the belt, controlling the sensor to read the test pattern formed on the belt, and adjusting the operation settings based on a difference between the test pattern as printed and read and an expected test pattern.

10. A method for controlling an image forming apparatus, the method comprising:

receiving an instruction to execute a first job via an operation panel;

determining whether the first job includes forming an image on a sheet;

upon determining that the first job includes forming an image on a sheet, determining whether a first condition for executing an adjustment operation to adjust one or more operation settings is satisfied, the operation settings being used when the image is formed;

upon determining that the first condition is satisfied, displaying a first screen through which execution of the adjustment operation and a timing for executing the adjustment operation can be selected; and executing one or both of the first job and the adjustment operation based on a selection made through the first screen, wherein the first condition is satisfied when:

a predetermined time has elapsed after a previous image formation, a difference between humidity during the previous image formation and current humidity exceeds a predetermined value, a number of sheets printed after a previous adjustment operation exceeds a predetermined number, or the image forming apparatus has recovered from a toner empty state.

11. The method according to claim 10, wherein the timing for executing the adjustment operation is either a first timing when the adjustment operation is executed before the first job or a second timing when the adjustment operation is executed after the first job.

12. The method according to claim 11, wherein the first screen includes a first button for selecting the first timing, a second button for selecting the second timing, and a third button for not executing the adjustment operation.

13. The method according to claim 11, further comprising:

determining whether a second condition for forcing execution of the adjustment operation is satisfied; and upon determining that the second condition is satisfied, displaying, instead of the first screen, a second screen through which either the first timing or the second timing can be selected.

14. The method according to claim 13, wherein the second condition is satisfied when a predetermined time has elapsed after a previous adjustment operation.

15. The method according to claim 13, wherein the second screen includes a first button for selecting the first timing and a second button for selecting the second timing.

16. The method according to claim 10, further comprising:

storing user information in a memory; and identifying a user who has operated the operation panel, wherein the adjustment operation is executed before the first job without displaying the first screen based on the user information.

17. The method according to claim 10, wherein when the first job includes an operation other than forming an image on a sheet, the operation and the adjustment operation are executed in parallel.

18. A non-transitory computer readable medium storing a program executed on a computer and causing the computer to execute a method comprising:

receiving an instruction to execute a first job via an operation panel;

determining whether the first job includes forming an image on a sheet;

upon determining that the first job includes forming an image on a sheet, determining whether a first condition for executing an adjustment operation to adjust one or more operation settings is satisfied, the operation settings being used when the image is formed;

upon determining that the first condition is satisfied, displaying a first screen through which execution of the adjustment operation and a timing for executing the adjustment operation can be selected; and executing one or both of the first job and the adjustment operation based on a selection made through the first screen, wherein the first condition is satisfied when:

a predetermined time has elapsed after a previous image formation, a difference between humidity during the previous image formation and current humidity exceeds a predetermined value, a number of sheets printed after a previous adjustment operation exceeds a predetermined number, or the image forming apparatus has recovered from a toner empty state.

* * * * *